US012677084B2

(12) United States Patent
Wang et al.

(10) Patent No.: US 12,677,084 B2
(45) Date of Patent: Jul. 7, 2026

(54) HANDHELD ELECTRONIC DEVICE

(71) Applicant: ASUSTEK COMPUTER INC., Taipei (TW)

(72) Inventors: Chun-Chi Wang, Taipei (TW); Kuo-Yuan Huang, Taipei (TW); Tsung-Yen Yu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 412 days.

(21) Appl. No.: 18/088,290

(22) Filed: Dec. 23, 2022

(65) Prior Publication Data

US 2023/0396904 A1 Dec. 7, 2023

(30) Foreign Application Priority Data

Jun. 2, 2022 (TW) .................................. 111120674

(51) Int. Cl.
*H04R 1/02* (2006.01)

(52) U.S. Cl.
CPC ............ *H04R 1/02* (2013.01); *H04R 2499/11* (2013.01)

(58) Field of Classification Search
CPC ........ H04R 3/12; H04R 2499/13; H04R 5/02; H04R 1/403; H04R 3/00; H04R 5/04; H04R 2420/01; H04R 2430/01; H04R 3/04; H04R 2420/03; H04R 27/00; H04R 1/26; H04R 2420/07; H04R 1/025; H04R 2205/022; H04R 3/02; H04R 3/14; H04R 1/02; H04R 1/20; H04R 2227/005; H04R 2430/00; H04R 25/453; H04R 1/22; H04R 2205/024; H04R 29/007; H04R 2201/028; H04R 2227/00; H04R 1/026; H04R 1/1083; H04R 2201/021; H04R 2430/20; H04R 2460/01; G10K 2210/1282; G10K 11/17817; G10K 11/17875; G10K 11/17885; G10K 11/346; G10K 15/02; G10K 2210/1081; G10K 9/12; H03F 2200/03; H03F 3/2173; H03F 3/68;

(Continued)

(56) References Cited

U.S. PATENT DOCUMENTS

| | | | | |
|---|---|---|---|---|
| 10,027,788 | B2 * | 7/2018 | Pierce | F41G 1/02 |
| 12,041,437 | B2 * | 7/2024 | So | H04R 5/02 |

(Continued)

FOREIGN PATENT DOCUMENTS

| | | |
|---|---|---|
| CN | 101933342 A | 12/2010 |
| CN | 103974167 A | 8/2014 |

(Continued)

*Primary Examiner* — Lun-See Lao
(74) *Attorney, Agent, or Firm* — MUNCY, GEISSLER, OLDS & LOWE, P.C.

(57) ABSTRACT

A handheld electronic device is provided. The handheld electronic device includes a housing, a first speaker, a second speaker, a third speaker, and a fourth speaker. The housing includes a back plate, a first sidewall, and a second sidewall. The first sidewall and the second sidewall are disposed at opposite sides of the back plate. The first sidewall is parallel to the second sidewall, and a length of the first sidewall is greater than a distance between the first sidewall and the second sidewall. The first speaker and the second speaker are disposed in the housing and arranged along the first sidewall. The third speaker and the fourth speaker are disposed in the housing and arranged along the second sidewall.

13 Claims, 5 Drawing Sheets

(58) Field of Classification Search
CPC .... H03F 3/183; H03F 3/181; H03F 2200/504; H03F 3/187; H03F 3/211; H03F 3/217; H03F 2200/321; H03F 1/0277; H03F 3/2178; H03F 3/02; H04S 2420/01; H04S 3/02; H04S 5/00; H04S 5/005; H04S 7/302; H04B 3/20; H04B 1/202; H03G 1/02; H03G 1/04; H03G 3/3005; H03G 3/32; H03G 5/025; H03G 5/165; H03G 7/005; H03G 7/02
USPC .................................. 381/334, 330, 120, 104
See application file for complete search history.

(56) References Cited

U.S. PATENT DOCUMENTS

| | | | | |
|---|---|---|---|---|
| 2014/0233772 | A1* | 8/2014 | Giustina | H04R 5/04 381/306 |
| 2020/0304892 | A1* | 9/2020 | Pawson | H04R 1/025 |

FOREIGN PATENT DOCUMENTS

| | | | |
|---|---|---|---|
| CN | 205430386 | U | 8/2016 |
| CN | 106559725 | A | 4/2017 |
| CN | 206775477 | U | 12/2017 |
| CN | 106507251 | B | 9/2018 |
| CN | 109429139 | A | 3/2019 |
| CN | 110602316 | A | 12/2019 |
| CN | 112789589 | A | 5/2021 |
| CN | 113206905 | A | 8/2021 |
| TW | 200930129 | A | 7/2009 |

* cited by examiner

HANDHELD ELECTRONIC DEVICE

CROSS-REFERENCE TO RELATED APPLICATION

This application claims priority to Taiwan Patent Application No. 111120674, filed on Jun. 2, 2022, which is incorporated herein by reference in its entirety.

BACKGROUND OF THE INVENTION

Field of the Invention

The disclosure relates to a handheld electronic device, and in particular, to a handheld electronic device with a plurality of speakers.

Description of the Related Art

A conventional handheld electronic device is mainly designed with two speakers. Although two speakers are configured to generate stereo, limited by the inner space of the handheld electronic device, a surround sound effect and a sound field width created by the two speakers are restricted, making it difficult to have a listening breakthrough.

SUMMARY OF THE INVENTION

The disclosure provides a handheld electronic device. The handheld electronic device includes a housing, a first speaker, a second speaker, a third speaker, and a fourth speaker. The housing includes a back plate, a first sidewall, and a second sidewall. The first sidewall and the second sidewall are disposed at opposite sides of the back plate. The first sidewall is parallel to the second sidewall, and a length of the first sidewall is greater than a distance between the first sidewall and the second sidewall. The first speaker and the second speaker are disposed in the housing and arranged along the first sidewall. The third speaker and the fourth speaker are disposed in the housing and arranged along the second sidewall.

The handheld electronic device provided by the disclosure improves the sound effect of the first speaker disposed in a first space by strengthening a low frequency part of a first channel signal, and solves a limit of the limited first space on structural characteristics of the speaker, balancing two channels and improving the overall sound quality.

Specific embodiments adopted by the disclosure will be further illustrated through the following embodiments and drawings.

DETAILED DESCRIPTION OF THE EMBODIMENTS

The following will describe specific embodiments of the disclosure in more detail with reference to drawings. According to the following description and claims, advantages and characteristics of the disclosure will be clearer. It should be noted that, drawings adopt a very simplified form and use a non-precise proportion, and are only used for conveniently and clearly illustrating embodiments of the disclosure.

Figure 1A:
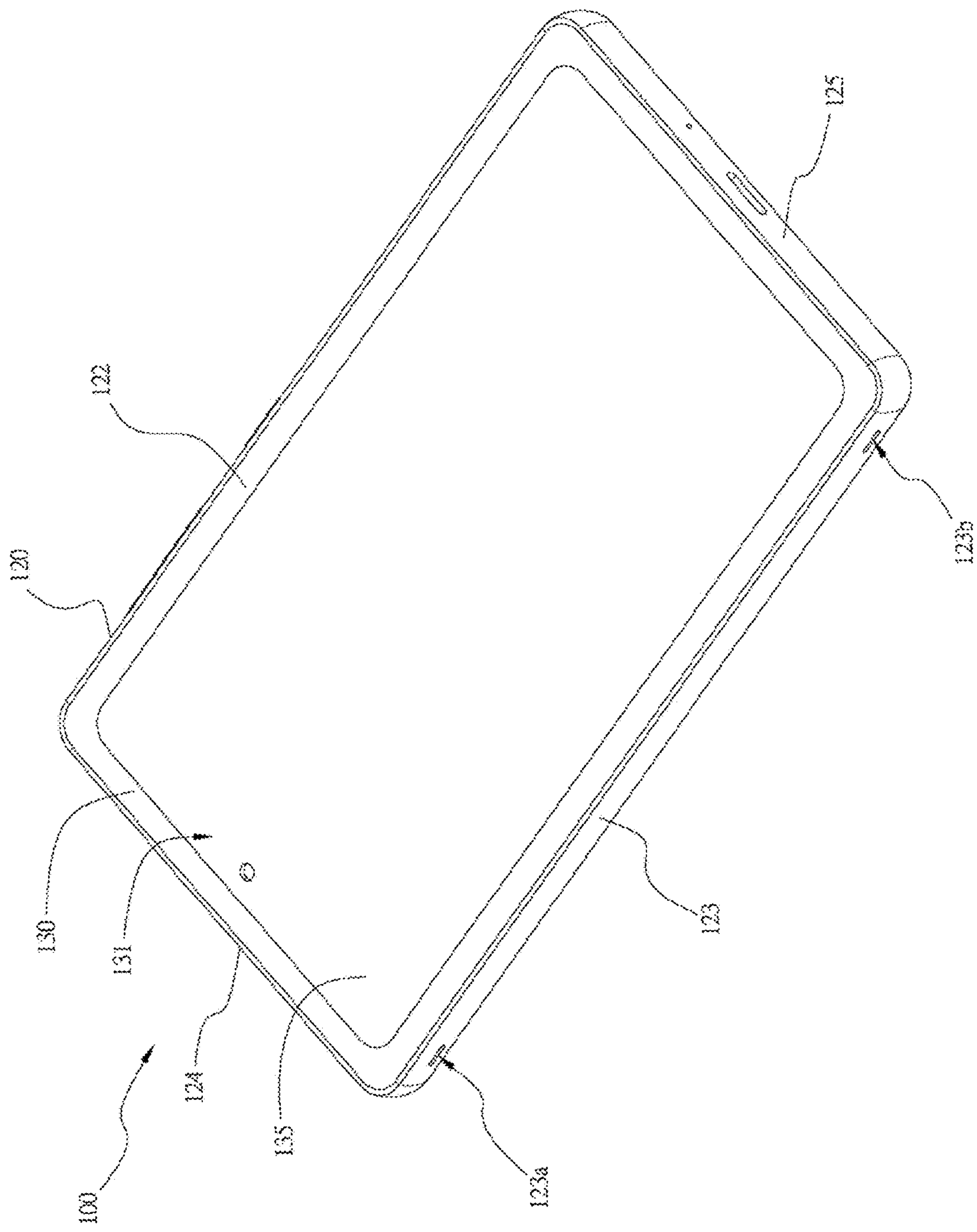
FIG. 1A is a schematic outside view of a handheld electronic device according to an embodiment of the disclosure.
Figure 1B:
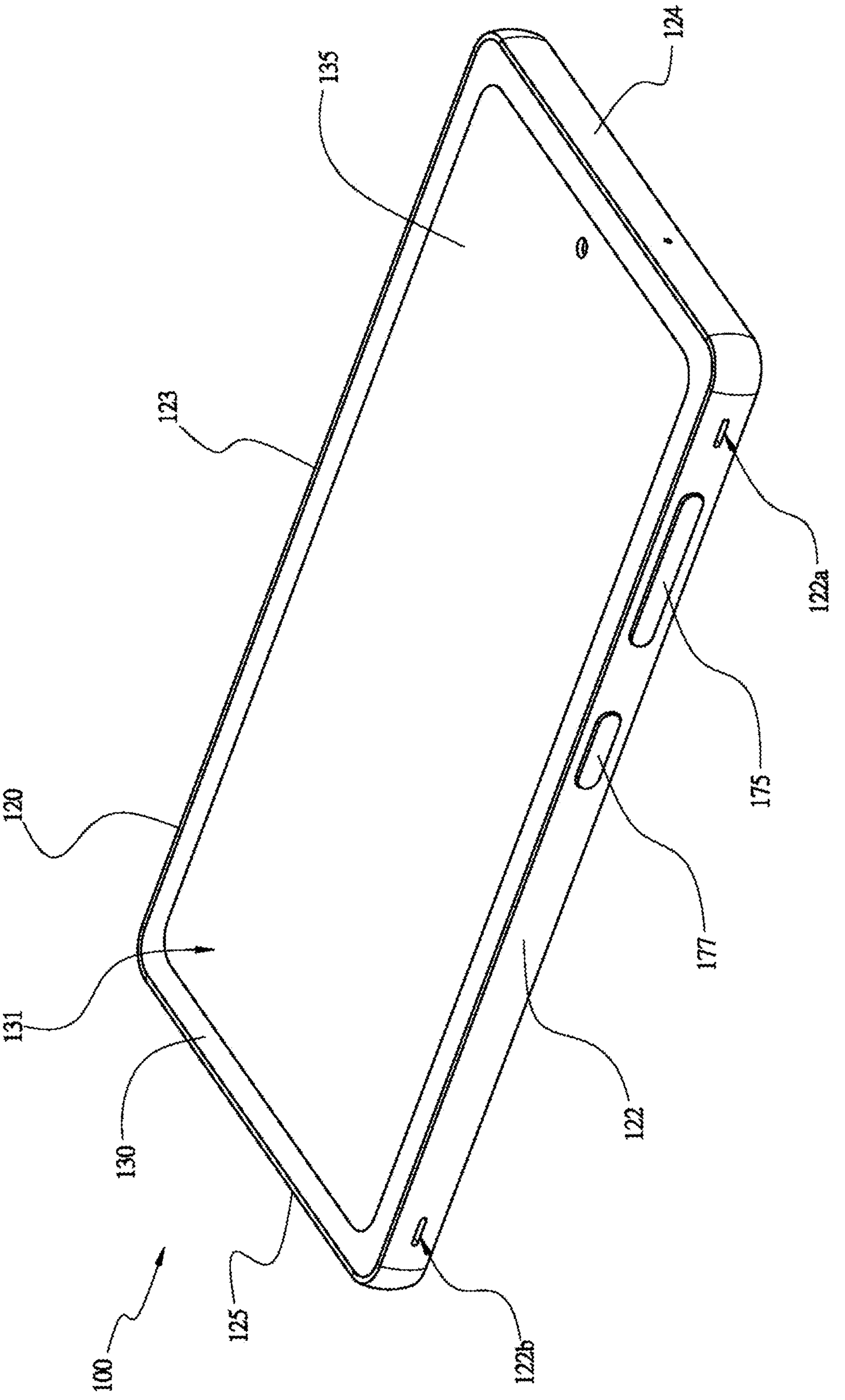
FIG. 1B is a schematic outside view from another perspective of the handheld electronic device of FIG. 1A.
Figure 2:
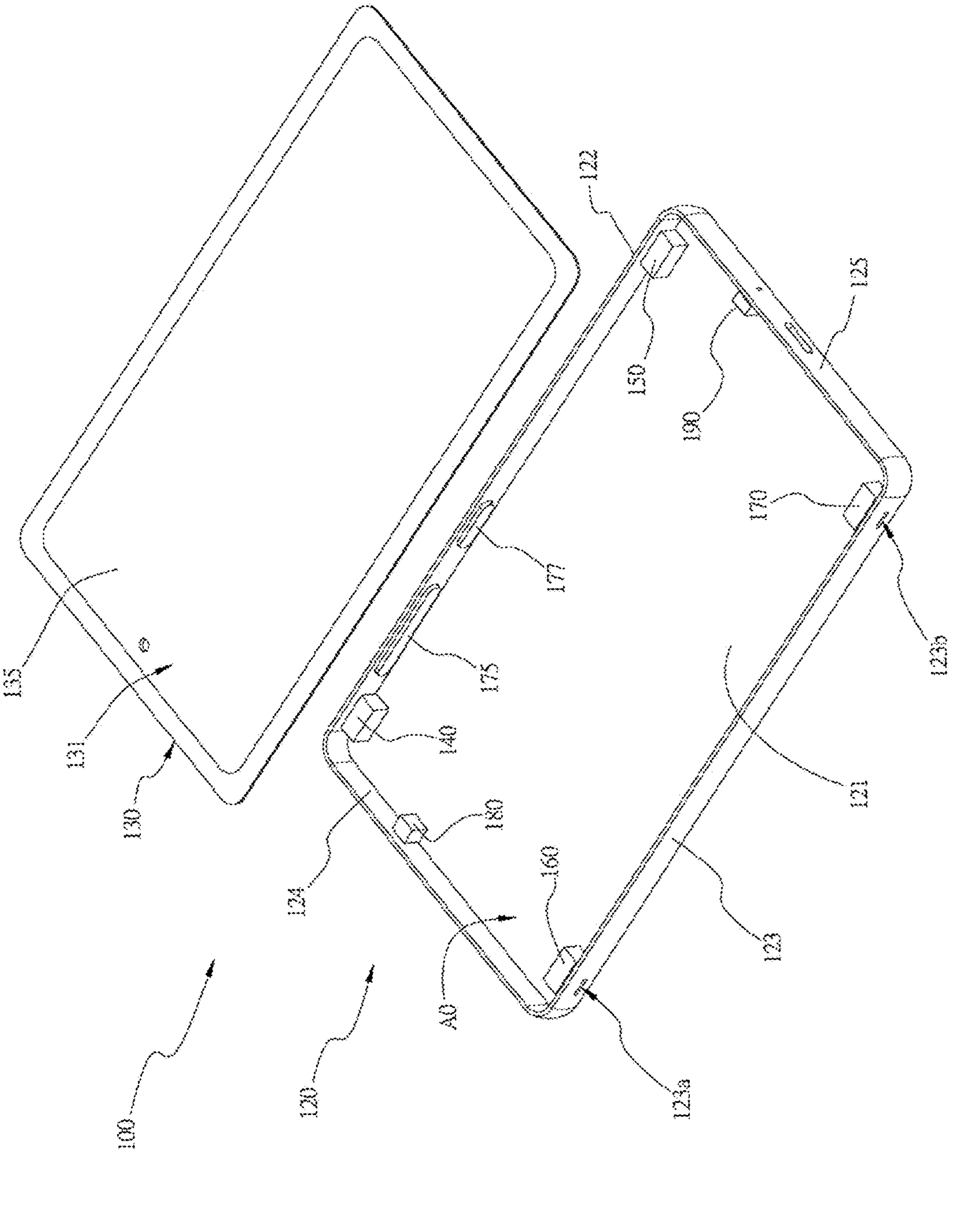
FIG. 2 is a schematic diagram of an inner space of the handheld electronic device of FIG. 1A.

FIG. 1A is a schematic outside view of a handheld electronic device 100 according to an embodiment of the disclosure, and FIG. 1B is a schematic outside view from another perspective of the handheld electronic device 100 of FIG. 1A. FIG. 2 is a schematic diagram of an inner space of the handheld electronic device 100 of FIG. 1A. The handheld electronic device 100 is a mobile phone, a tablet computer, or another handheld electronic device 100 with a plurality of speakers providing a multi-channel sound effect. Drawings take a mobile phone as an example to illustrate the technical solutions of the disclosure.

As shown in drawings, the handheld electronic device 100 includes a housing 120, a front frame 130, a first speaker 140, a second speaker 150, a third speaker 160, and a fourth speaker 170.

The housing 120 includes a back plate 121, a first sidewall 122, a second sidewall 123, a top portion 124, and a bottom portion 125. The first sidewall 122 and the second sidewall 123 are disposed at opposite sides of the back plate 121, the first sidewall 122 is parallel to the second sidewall 123, a length of the first sidewall 122 is equal to a length of the second sidewall 123, and the length of the first sidewall 122 is greater than a distance between the first sidewall 122 and the second sidewall 123.

Two ends of the first sidewall 122 are connected to the top portion 124 and the bottom portion 125 respectively. The first sidewall 122, the second sidewall 123, the top portion 124, and the bottom portion 125 form a square frame, and define a square space A0 on the back plate 121. The front frame 130 is disposed on the front of the housing 120, and is fixed on the foregoing square frame to cover the square space A0. The front frame 130 is provided with a hole 131 corresponding to a display range of a display panel 135.

The first speaker 140 and the second speaker 150 are disposed in the housing 120 and arranged along the first sidewall 122. The third speaker 160 and the fourth speaker 170 are disposed in the housing 120 and arranged along the second sidewall 123. That is to say, the first speaker 140, the second speaker 150, the third speaker 160, and the fourth speaker 170 are grouped in pairs and arranged along a long side of the handheld electronic device 100. In an embodiment, as shown in drawings, the first speaker 140 is located at a position on an inner side of the first sidewall 122 near the top portion 124, the second speaker 150 is located at a position on the inner side of the first sidewall 122 near the bottom portion 125, the third speaker 160 is located at a position on an inner side of the second sidewall 123 near the top portion 124, and the fourth speaker 170 is located at a position on the inner side of the second sidewall 123 near the bottom portion 125.

In an embodiment, the handheld electronic device 100 includes a volume adjustment button 175 and a power button 177. The volume adjustment button 175 is provided for a user to adjust volume of the first speaker 140, the second speaker 150, the third speaker 160, and the fourth speaker 170, and the power button 177 is provided for the user to power on or off the handheld electronic device 100. In terms of disposition positions, in an embodiment, the volume adjustment button 175 and the power button 177 are disposed on the right of the handheld electronic device 100 under the longitudinal operating condition, and the first speaker 140 of the disclosure is located between the volume adjustment button 175 and the top portion 124 of the handheld electronic device 100.

In an embodiment, as shown in drawings, the handheld electronic device 100 further includes a fifth speaker 180 and a microphone 190. The fifth speaker 180 is disposed in the housing 120 and near the top portion 124 of the housing 120. The microphone 190 is disposed in the housing 120 and near the bottom portion 125 of the housing 120. The fifth speaker 180 and the microphone 190 are used for calling.

Figure 3:
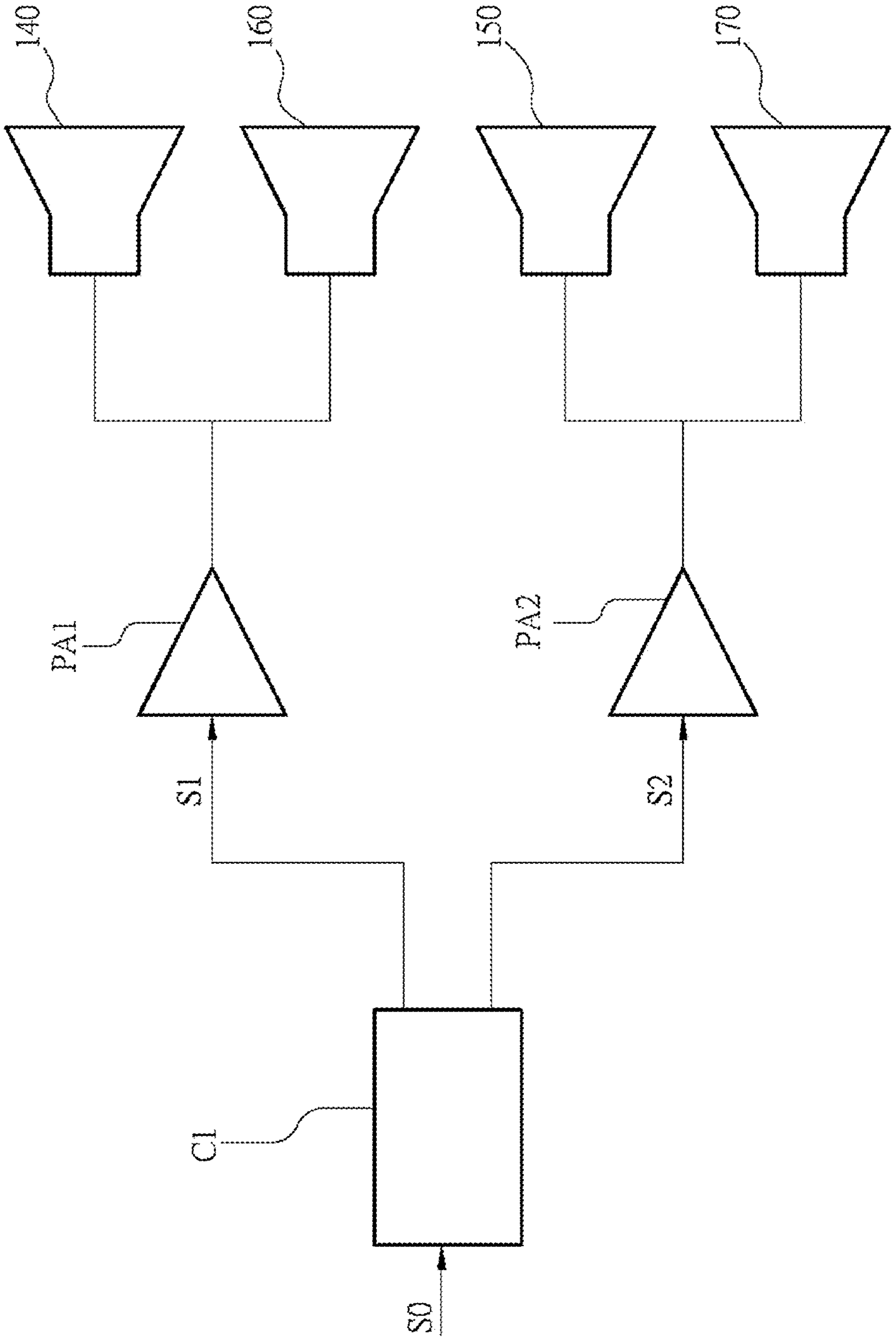
FIG. 3 is a schematic block diagram of the handheld electronic device of FIG. 1A.

FIG. 3 is a schematic block diagram of the handheld electronic device 100 of FIG. 1A.

As shown in drawings, the handheld electronic device 100 is internally provided with a control unit C1, a first power amplifier PA1, and a second power amplifier PA2. The control unit C1 electrically connects the first speaker 140 and the third speaker 160 through the first power amplifier PA1, and electrically connects the second speaker 150 and the fourth speaker 170 through the second power amplifier PA2.

The control unit C1 is an independent audio control chip, or a partial circuit in a control chip.

The control unit C1 generates a first channel signal S1 and a second channel signal S2 according to a sound signal S0. The sound signal S0 comes from sound effect data of a game, sound effect data of a video file, or sound data. In an embodiment, the first channel signal S1 and the second channel signal S2 are a left channel signal and a right channel signal respectively.

The first channel signal S1 is provided to the first power amplifier PA1 to drive the first speaker 140 and the third speaker 160. The second channel signal S2 is provided to the second power amplifier PA2 to drive the second speaker 150 and the fourth speaker 170. That is to say, the first speaker 140 and the third speaker 160 make sounds according to the first channel signal S1, and the second speaker 150 and the fourth speaker 170 make sounds according to the second channel signal S2.

When the user transversely operates the handheld electronic device 100, in an embodiment, plays an online game or executes an audio and video program, the first speaker 140 and the third speaker 160 are located on the left of the user to provide the left channel signal, and the second speaker 150 and the fourth speaker 170 are located on the right of the user to provide the right channel signal.

Considering the symmetry of a left channel and a right channel, in an embodiment, the first speaker 140, the second speaker 150, the third speaker 160, and the fourth speaker 170 are identical speakers, such as full-range speakers. In an embodiment, the disposition positions of the first speaker 140 and the second speaker 150 are symmetrical with respect to a middle position of the first sidewall 122. The disposition positions of the third speaker 160 and the fourth speaker 170 are symmetrical with respect to a middle position of the second sidewall 123. Still, in an embodiment, a distance between the first speaker 140 and second speaker 150 is equal to a distance between the third speaker 160 and the fourth speaker 170. In another embodiment, the distance between the first speaker 140 and the second speaker 150 is different from the distance between the third speaker 160 and the fourth speaker 170, to perform adjustment to achieve the sound effect needed.

Go back to FIG. 1A and FIG. 1B. To make the sounds generated by the first speaker 140 and the second speaker 150 be transmitted to the outside through the housing 120 successfully, the first sidewall 122 of the housing 120 includes a first hole 122*a* and a second hole 122*b*, of which the disposition positions correspond to the first speaker 140 and the second speaker 150 respectively. Similarly, the second sidewall 123 of the housing 120 includes a third hole 123*a* and a fourth hole 123*b*, of which the disposition positions correspond to the third speaker 160 and the fourth speaker 170 respectively.

During transverse operating, the sound signals generated by the first speaker 140 and the second speaker 150 are transmitted upward through the first hole 122*a* and the second hole 122*b* disposed on the first sidewall 122, and the sound signals generated by the third speaker 160 and the fourth speaker 170 are transmitted downward through the third hole 123*a* and the fourth hole 123*b* disposed on the second sidewall 123. In this way, in addition to presentation of the sound effect of the left channel and the right channel, the upward and downward sounding directions further create a better sense of space, helping strengthen the sound field width.

Figure 4:
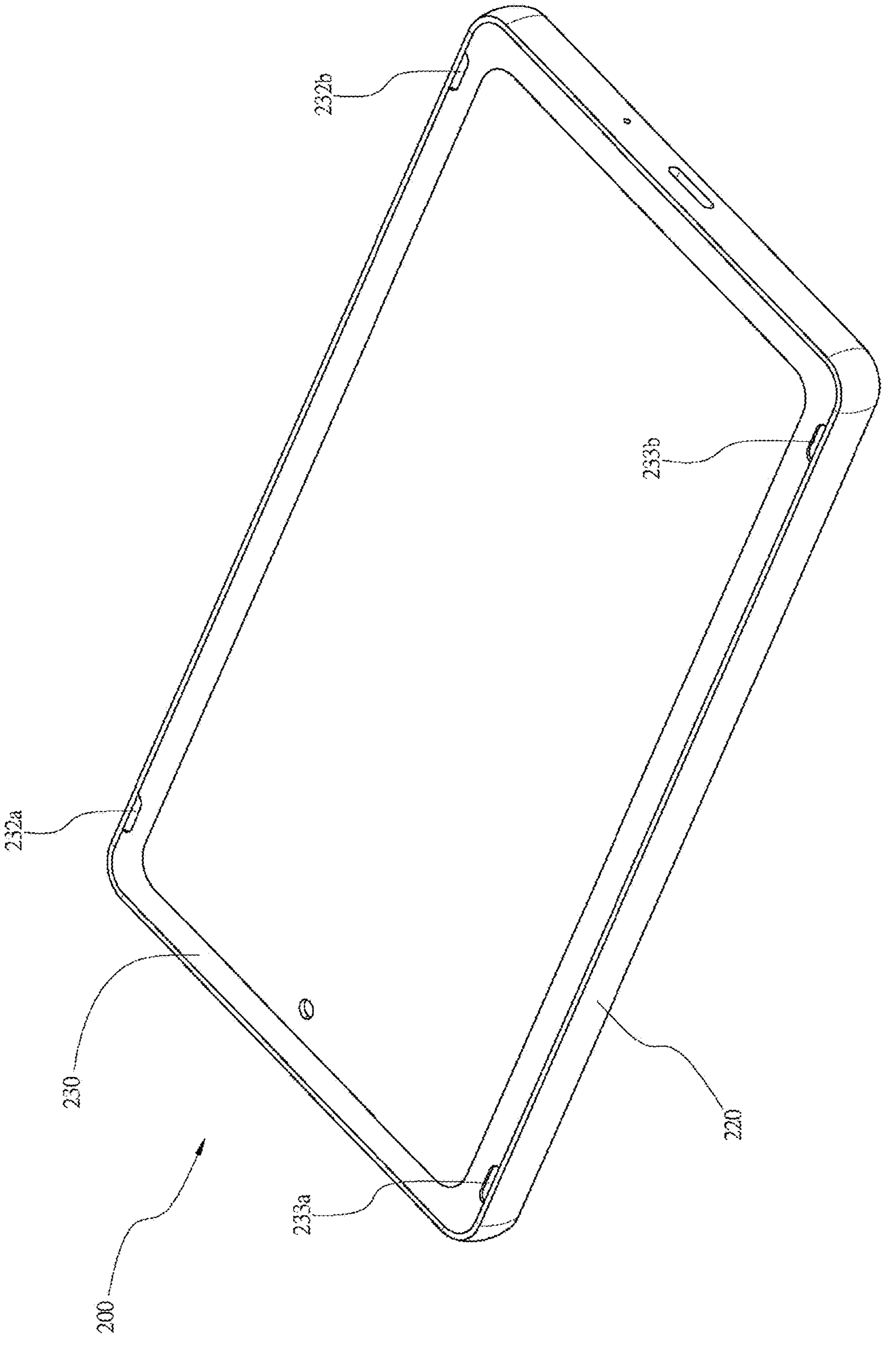
FIG. 4 is a schematic diagram of a handheld electronic device according to another embodiment of the disclosure.

FIG. 4 is a schematic diagram of a handheld electronic device 200 according to another embodiment of the disclosure.

A main difference between this embodiment and the embodiment in FIG. 1A is disposition positions of a first hole 232*a*, a second hole 232*b*, a third hole 233*a*, and a fourth hole 233*b*.

Compared with the embodiment in FIG. 1A, the first hole 122*a* and the second hole 122*b* are formed on the first sidewall 122, the third hole 123*a* and the fourth hole 123*b* are formed on the second sidewall 123. In this embodiment, the first hole 232*a*, the second hole 232*b*, the third hole 233*a*, and the fourth hole 233*b* are formed in edge areas on opposite sides of a front frame 230, to correspond to the positions of the first speaker 140, the second speaker 150, the third speaker 160, and the fourth speaker 170 respectively. Neither of a first sidewall 222 and a second sidewall 223 of a housing 220 is provided with a hole used for making a sound. In an embodiment, notches are formed on the opposite sides of the front frame 230, and these notches are used as the first hole 232*a*, the second hole 232*b*, the third hole 233*a*, and the fourth hole 233*b*. In this way, the first hole 232*a* and the second hole 232*b* are located between the front frame 230 and the first sidewall 122, and the third hole 233*a* and the fourth hole 233*b* are located between the front frame 230 and the second sidewall 123.

During transverse operating, the sound signals generated by the first speaker 140, the second speaker 150, the third speaker 160, and the fourth speaker 170 are all transmitted toward the front of the handheld electronic device 200 through the first hole 232*a*, the second hole 232*b*, the third hole 233*a*, and the fourth hole 233*b* disposed on the front frame 230. In this way, the sound generated by the handheld electronic device 200 is more concentrated, to present a stronger sound effect.

The handheld electronic device 100 and the handheld electronic device 200 provided by the disclosure improve the sound effect of the first speaker 140 disposed in a space of the top portion 124 by strengthening a low frequency part of the first channel signal S1, and solves a limit of the limited space of the top portion on structural characteristics of the first speaker 140, balancing two channels and improving the overall sound quality.

The above are only exemplary embodiments of the disclosure but do not limit the disclosure. Variations such as equivalent replacements or modifications in any form made by any person skilled in the art to the technical means and technical contents disclosed in the disclosure without departing from the technical means of the disclosure are contents not departing from the technical means of the disclosure and still fall within the protection scope of the disclosure.

What is claimed is:

1. A handheld electronic device, comprising:

a housing, comprising a back plate, a first sidewall, and a second sidewall, wherein the first sidewall and the second sidewall are disposed at opposite sides of the back plate, the first sidewall is parallel to the second sidewall, and a length of the first sidewall is greater than a distance between the first sidewall and the second sidewall;

a first speaker and a second speaker, disposed in the housing and arranged along the first sidewall;

a third speaker and a fourth speaker, disposed in the housing and arranged along the second sidewall;

wherein the handheld electronic device further comprises a volume adjustment button located at the first sidewall, and the first speaker is located between the volume adjustment button and a top portion of the handheld electronic device, and wherein the second speaker is located between the volume adjustment button and a bottom portion of the handheld electronic device.

2. The handheld electronic device according to claim 1, wherein the first speaker and the second speaker are symmetrical with respect to a middle position of the first sidewall.

3. The handheld electronic device according to claim 1, wherein the third speaker and the fourth speaker are symmetrical with respect to a middle position of the second sidewall.

4. The handheld electronic device according to claim 1, wherein the length of the first sidewall is equal to a length of the second sidewall.

5. The handheld electronic device according to claim 1, wherein the housing further comprises a top portion and a bottom portion, two ends of the first sidewall are connected to the top portion and the bottom portion respectively, the first speaker is located at a position on the first sidewall near the top portion, and the second speaker is located at a position on the first sidewall near the bottom portion.

6. The handheld electronic device according to claim 5, further comprising a fifth speaker disposed in the housing and near the top portion.

7. The handheld electronic device according to claim 5, further comprising a microphone disposed in the housing and near the bottom portion.

8. The handheld electronic device according to claim 1, wherein a distance between the first speaker and the second speaker is equal to a distance between the third speaker and the fourth speaker.

9. The handheld electronic device according to claim 1, wherein the first sidewall comprises a first hole and a second hole corresponding to the first speaker and the second speaker respectively, and the second sidewall comprises a third hole and a fourth hole corresponding to the third speaker and the fourth speaker respectively.

10. The handheld electronic device according to claim 1, wherein the first speaker, the second speaker, the third speaker, and the fourth speaker are full-range speakers.

11. The handheld electronic device according to claim 1, wherein the first speaker, the second speaker, the third speaker, and the fourth speaker are identical speakers.

12. The handheld electronic device according to claim 1, further comprising a control unit, electrically connecting the first speaker, the second speaker, the third speaker, and the fourth speaker, wherein the control unit is configured to generate a first channel signal and a second channel signal, the first speaker and the third speaker make sounds according to the first channel signal, and the second speaker and the fourth speaker make sounds according to the second channel signal.

13. The handheld electronic device according to claim 1, further comprising a first power amplifier and a second power amplifier, wherein the first power amplifier is configured to drive the first speaker and the third speaker, and the second power amplifier is configured to drive the second speaker and the fourth speaker.

* * * * *